(12) United States Patent
Marcuse et al.

(10) Patent No.: US 6,385,383 B1
(45) Date of Patent: *May 7, 2002

(54) OPTICAL ATTENUATOR STRUCTURE AND METHOD USING POLYMER MATERIAL

(75) Inventors: Dietrich Marcuse, Lincroft; Herman M. Presby, Highland Park, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/166,359

(22) Filed: Oct. 5, 1998

(51) Int. Cl.$^7$ ................................................. G02B 6/00
(52) U.S. Cl. ....................................... 385/140; 385/145
(58) Field of Search ................................. 385/123, 126, 385/127, 128, 129, 140, 141, 145

(56) References Cited

U.S. PATENT DOCUMENTS

| | | | | |
|---|---|---|---|---|
| 4,373,768 A | * | 2/1983 | Clarke ..................... | 350/96.34 |
| 4,417,782 A | * | 11/1983 | Clarke et al. ............ | 350/96.29 |
| 4,505,542 A | * | 3/1985 | Clarke ..................... | 350/96.33 |
| 4,529,262 A | * | 7/1985 | Ashkin et al. ........... | 350/96.15 |
| 5,004,913 A | * | 4/1991 | Kleinerman ........... | 250/227.21 |
| 5,966,493 A | * | 10/1999 | Wagoner et al. ............ | 385/140 |
| 5,999,283 A | * | 12/1999 | Roberts et al. ............. | 359/108 |
| 6,115,519 A | * | 9/2000 | Espindola et al. ............ | 385/43 |

* cited by examiner

Primary Examiner—Frank G. Font
Assistant Examiner—Michael P. Mooney
(74) Attorney, Agent, or Firm—Thomas, Kayden, Horstemeyer & Risley LLP

(57) ABSTRACT

An optical attenuator and method, the optical attenuator having a core which is covered by a cladding material with a section of polymer cladding of an identifiable length. The polymer cladding has an index of refraction that varies with temperature. A thermal device such as a thermoelectric heater or cooler is placed adjacent to the polymer cladding to control the temperature of the cladding. The index of refraction of the polymer cladding is manipulated by changing its temperature by supplying power to the thermal device. The index of refraction of the polymer cladding will range from values below and above the index of refraction of the core material. A light wave transmitted through the core will experience a degree of attenuation due to leakage into the polymer cladding material when the index of refraction of the polymer cladding is equal to or greater than the index of refraction of the core. The light wave may be either attenuated or blocked entirely.

15 Claims, 8 Drawing Sheets

OPTICAL ATTENUATOR STRUCTURE AND METHOD USING POLYMER MATERIAL

FIELD OF THE INVENTION

The present invention relates to the field of optical waveguides and, more particularly, to the materials used to construct optical waveguides.

BACKGROUND OF THE INVENTION

Current communications networks throughout the world have embraced the use of optical fiber waveguide technology to provide a conduit of transmission components for voice, video, and data signals. Optical networks offer far greater bandwidth and reliability than do conventional electronic networks. As a consequence, current research efforts have been directed to expanding the capabilities of optical waveguide technology at reduced cost to aid in the acceleration of the conversion of the present electrical communications networks to optical communications networks.

These optical communications networks are comprised of many different components. These include optical fiber cable, switches, attenuators, couplers, and many more such devices. Typically, these devices are comprised of a core surrounded by a cladding material. Both the materials used for the core and the cladding include silica or doped silica as well as many other similar materials. These materials are employed because they have a desirable index of refraction and as well as other properties which facilitate their use.

Of ten times it is desirable to create specific effects on the propagation of the optical signal transmitted through these devices. For example, one such effect is to either attenuate or interrupt an optical signal. Consequently, there is a need for new optical structures which will facilitate the attenuation and interruption of an optical signal in an optical waveguide.

SUMMARY OF THE INVENTION

The present invention entails an optical attenuator having a core which is covered by a cladding material with a section of polymer cladding of an identifiable length. The polymer cladding has an index of refraction that varies with temperature. A thermal device such as a thermoelectric heater or cooler is placed adjacent to the polymer cladding to control the temperature of the cladding. The index of refraction of the polymer cladding is manipulated by changing its temperature by supplying power to the thermal device. The index of refraction of the polymer cladding will range from values below and above the index of refraction of the core material. A light wave transmitted through the core will experience a degree of attenuation due to leakage into the polymer cladding material when the index of refraction of the polymer cladding is equal to or greater than the index of refraction of the core. The light wave may be partially or entirely attenuated.

The present invention may also be viewed as a method for attenuating an optical signal in a waveguide comprising the steps of transmitting an optical signal having an initial power strength through an optical attenuator having a section of polymer cladding of identifiable length, and determining a desired optical signal strength at the output of the optical attenuator. Finally, the step of controlling the temperature of the polymer cladding to attenuate the optical signal to the desired optical signal strength is performed.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

The Use of Polymer Material in Optical Waveguide Structures

Figure 1:
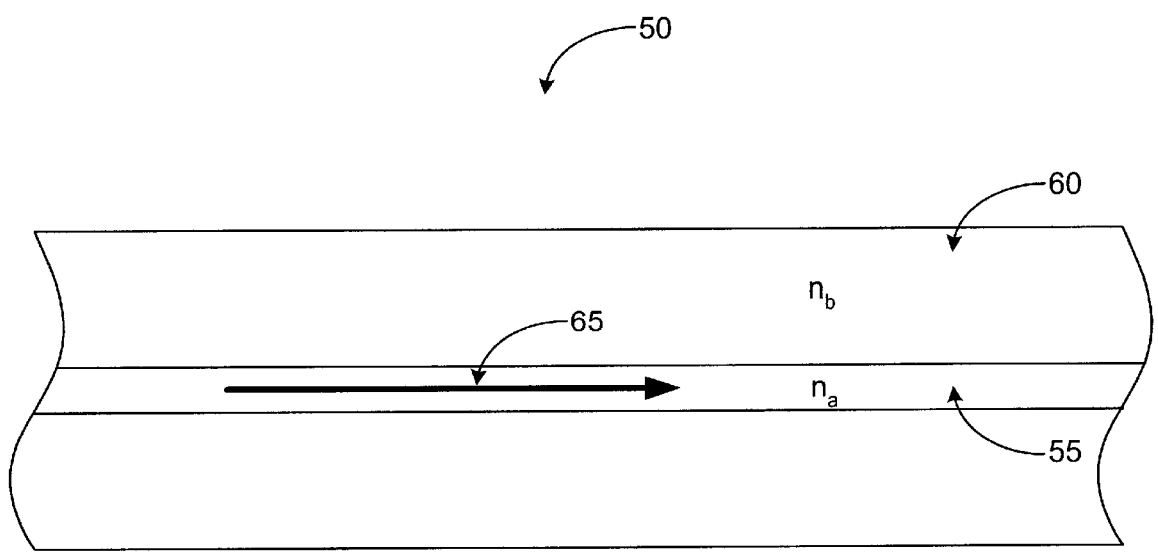
FIG. 1 is a drawing showing a conventional optical fiber waveguide.

Turning to FIG. 1, shown is a waveguide which comprises a conventional optical fiber 50. The optical fiber 50 comprises a core 55 surrounded by a cladding 60. The core is comprised of a material with an index of refraction of $n_a$. The cladding 60 is comprised of a material with an index of refraction of $n_b$. The optical fiber 50 operates as a waveguide for light radiation 65 when $n_a$ is greater than $n_b$ as is known by those skilled in the art. When $n_a$ is less than or equal to $n_b$, the light radiation 65 leaves the core and will not propagate along the core 55.

Figure 2A:
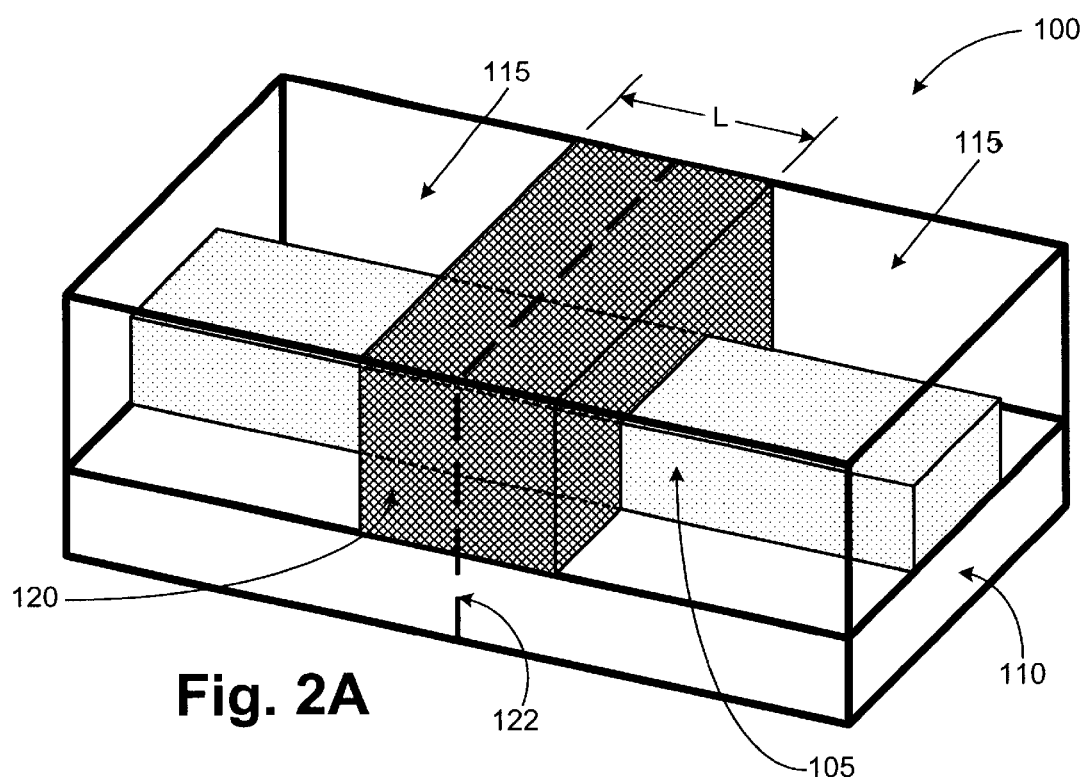
FIG. 2A is a drawing showing an optical waveguide.
Figure 2B:
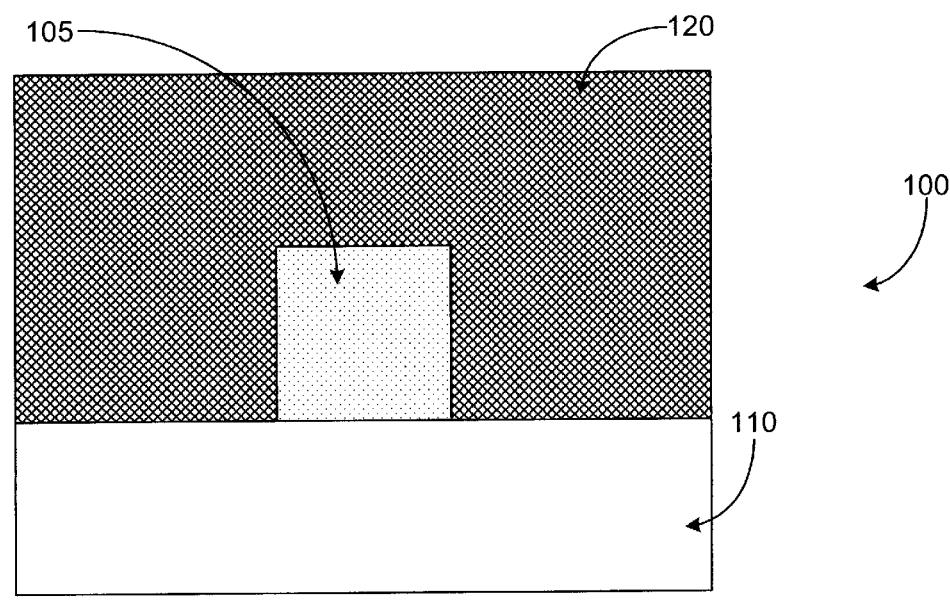
FIG. 2B is a drawing showing a sectional view of the optical waveguide of FIG. 2A.

With these concepts is mind, reference is made to FIGS. 2A and 2B which show a waveguide structure 100 according to an embodiment of the present invention. In FIG. 2A, the waveguide structure 100 includes a core 105 which is formed on a substrate 110. The core 105 is surrounded by a silica cladding material 115 which encloses the remaining sides of the core 105 not bounded by the substrate 110. In a section of identifiable length L, a polymer cladding material 120 encloses the remaining sides of the core 105 instead of the silica cladding material 115. The core 105 has an index of refraction of $n_R$, the substrate 110 has an index of refraction of $n_S$, the silica cladding material 115 has an index of refraction of $n_C$, and the polymer cladding material 120 has an index of refraction of $n_P$. A cutaway line 122 is shown around the waveguide structure 100. In FIG. 2B, shown is a sectional view of the waveguide structure 100 taken along the cutaway line 122 (FIG. 2A) in the middle of the polymer cladding material 120. Note that the waveguide structure 100 is generally a planar waveguide structure. However, the invention may also be accomplished using optical fiber structures based on the principles described herein.

The polymer cladding material 120 is taken from the general category of materials classified as polymers which generally are chemical compounds with high molecular weight comprising a number of structural units linked together by covalent bonds. Polymers which qualify for use as the polymer cladding 130 should generally possess the optical characteristics including an index of refraction that varies with temperature as will be discussed.

The core 105 may comprise doped silica and the substrate 110 may comprise silica, however, it is understood that other materials may be employed as known by those skilled in the art. Consequently, an exhaustive list of possible materials used to create these components is not offered herein.

It is understood that the waveguide structure 100 is for illustrative purposes and is not the only structural configuration possible. It may be possible for example, that the polymer cladding material 120 only contact the core 105 in identifiable regions such as on the upper surface of the core 105, for example. According to embodiments of the invention, the design of the actual waveguide structure 100 is such that the polymer cladding material 120 comes into contact with the core 105 so that the propagation of light radiation through the core 105 can be manipulated by controlling the index of refraction of the polymer cladding material 120 relative to the index of refraction of the core 105 to achieve certain advantages.

The polymer cladding material 120 features a relatively high thermo-optic coefficient $$\frac{\partial n_p}{\partial T}$$

due to the fact that the index of refraction of polymers can vary significantly with changing temperature. For example, the thermo-optic coefficient $$\frac{\partial n_p}{\partial T}$$

generally may be as high as $-0.0001C^{-1}$ and even up to $-0.0003C^{-1}$, where $n_P$ is the refractive index of the polymer and T is temperature. In contrast, the thermo-optic coefficient of silica is much lower, being on the order of $0.00001C^{-1}$. Consequently, the index of refraction of fused silica and other similar materials will not change significantly when subjected to heat, while the index of refraction of the polymer will change significantly.

Figure 3:
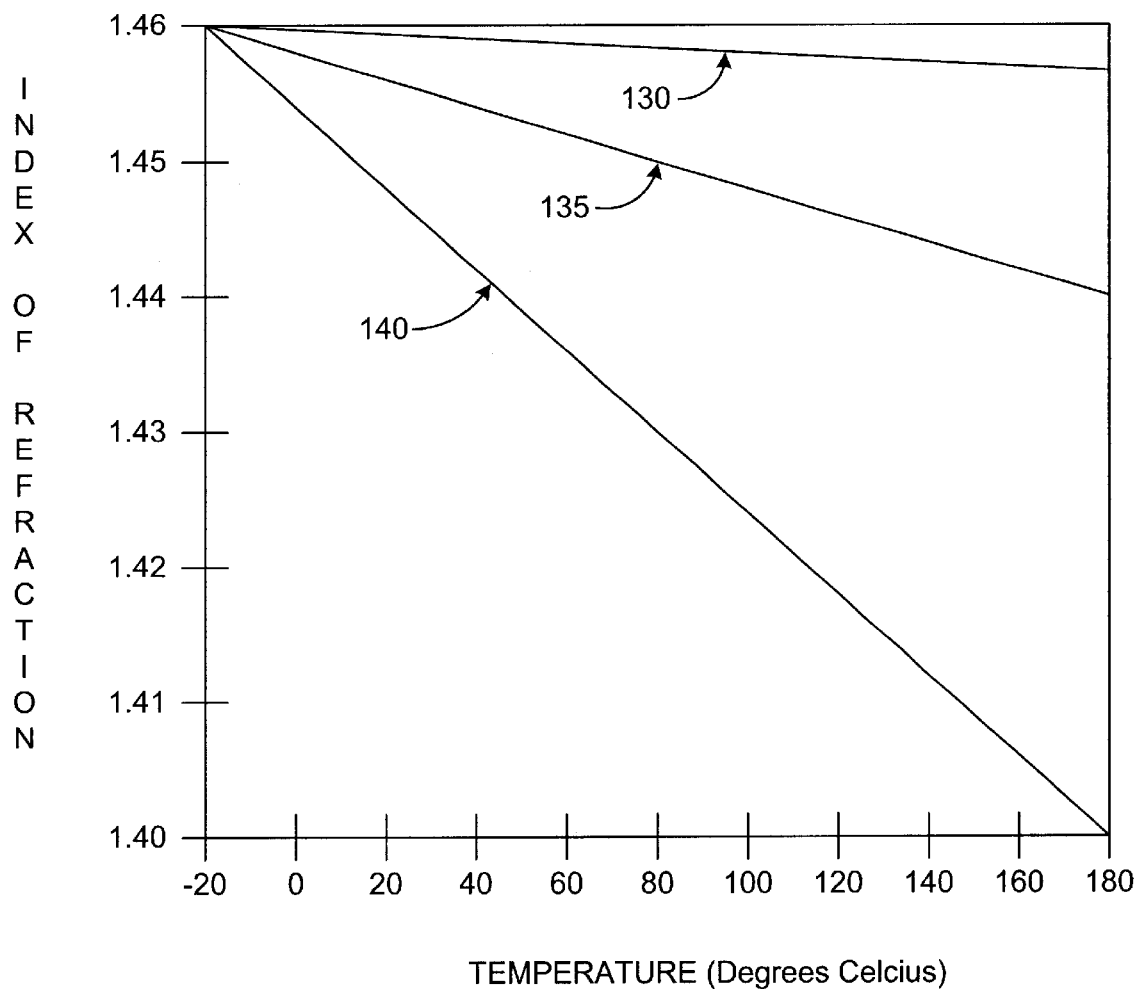
FIG. 3 is a chart of the indexes of refraction of example polymers as a function of temperature.

Referring to FIG. 3, shown is a graph depicting the index of refraction as a function of temperature in degrees Celsius of three example polymers which may be used as the polymer cladding material 120. Line 130 depicts the index of refraction of F/CA polymer which has a thermal coefficient of $-0.00002C^{-1}$, line 135 depicts the index of refraction of D-PMMA/D-FA polymer which has a thermal coefficient of $0.0001C^{-1}$, and line 140 depicts the index of refraction of FA polymer which has a thermal coefficient of $-0.0003C^{-1}$. Note that the starting point at n=1.46 and Temperature=$-20°$ C. were chosen arbitrarily. Ultimately, the indexes of refraction of various polymers depend upon their composition and can vary over a relatively wide range as a function of temperature.

The change of the index of refraction of a polymer cladding as contemplated herein provides distinct advantages. For example, a change in the propagation constant β of the guided wave can be made by changing the temperature of the polymer cladding. Also, the propagation of light radiation through the core may be diminished or stopped by raising the index of refraction of the polymer cladding above that of the core.

Figure 4A:
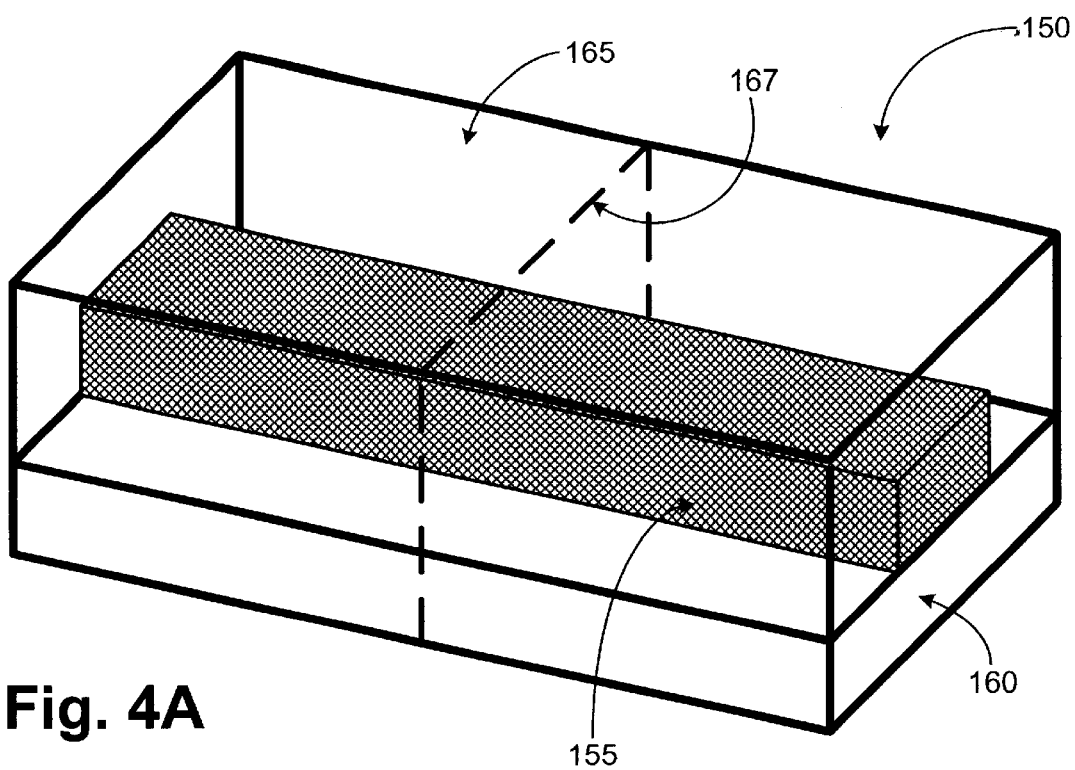
FIG. 4A is a drawing showing a second optical waveguide.
Figure 4B:
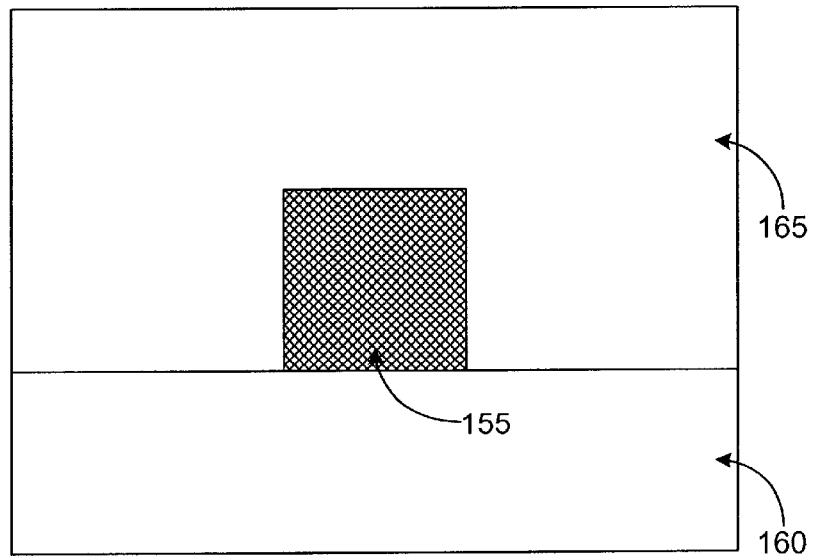
FIG. 4B is a drawing showing a sectional view of the second optical waveguide of FIG. 4A.

Turning next to FIG. 4A, shown is a waveguide structure 150 according to another embodiment of the present invention. The waveguide structure 150 features a polymer core 155 formed on a substrate material 160 and surrounded on the remaining sides by a cladding material 165. The cladding material 165 may be another polymer or other material that has an index of refraction that allows the propagation of light through the polymer core 155. The relative indexes of refraction of the polymer core 155 and the cladding material 165 are manipulated to achieve the desired propagation through the waveguide structure 150. A cutaway line 167 is shown around the middle of the waveguide structure 150. FIG. 4B shows is a sectional view of the waveguide structure 150 taken along the cutaway line 167 (FIG. 4A).

Figure 5:
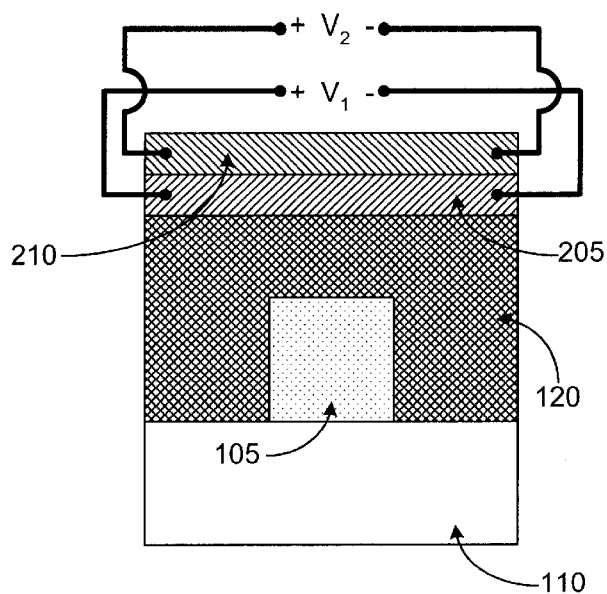
FIG. 5 is a drawing showing an optical waveguide system that employs a thermo-electric heater with the optical waveguide of FIG. 2A.

Referring to FIG. 5, shown is a waveguide system 200 according to another embodiment of the present invention. The waveguide system 200 features the waveguide structure 100 (FIG. 2B) which includes the polymer cladding material 120 with the core 105 formed on a substrate 110. The waveguide system 200 further includes a thermo-electric heater 205 and a thermoelectric cooler 210. The thermo-electric heater 205 is electrically coupled to a voltage source $V_1$ and may be of the chrome strip type. Other types of thermoelectric heaters 205 may include electrically conducting glass materials. The thermoelectric cooler 210 is electrically coupled to a voltage source $V_2$. The waveguide system 200 may be constructed with the thermo-electric heater 205 alone or with the thermoelectric cooler 210 alone depending on the ambient temperature and the desired range for the index of refraction of the polymer material. The waveguide system 200 is accomplished preferably on an integrated optical circuit which are well known by those skilled in the art and not discussed here in detail.

Figure 6:
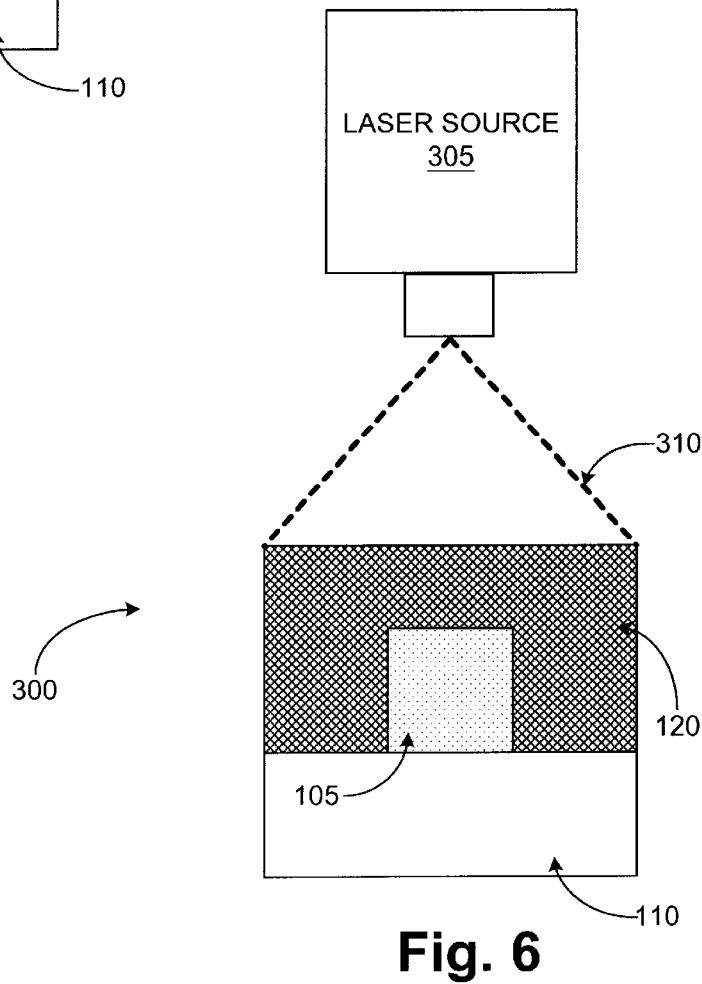
FIG. 6 is a drawing showing an optical waveguide system that employs a laser source with the optical waveguide of FIG. 2A.

Referring next, to FIG. 6, shown is a second waveguide system 300 according to an additional embodiment of the present invention. The waveguide system 300 also features the waveguide structure 100 (FIG. 2B) which includes the polymer cladding material 120 with the core 105 formed on the substrate 110. In addition, the waveguide system 300 includes a laser source 305 which produces laser radiation 310. The laser source 305 is positioned such that the laser radiation 310 falls onto the polymer cladding material 120. The laser radiation 310 heats up the polymer cladding material 120 resulting in a corresponding change in the index of refraction of the polymer cladding material 120. Note that a thermoelectric cooler 210 (FIG. 5) may be included in the waveguide system 300 similar to the waveguide system 200.

Use of Polymer Material in an Optical Attenuator

Figure 7:
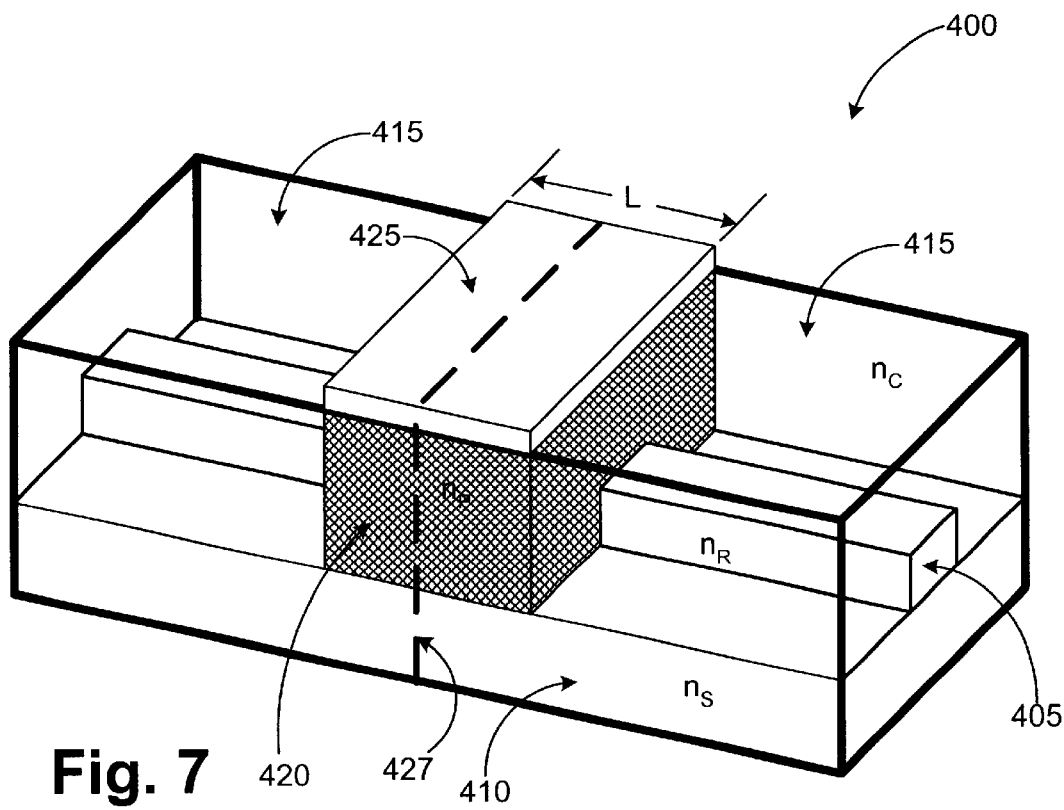
FIG. 7 is a drawing showing an optical attenuator according to an embodiment of the present invention.

The foregoing discussion relates to the use of the polymer material in a waveguide. The following discourse relates to the use of the polymer material in the specific application of an optical attenuator. Turning then to FIG. 7, shown is an optical attenuator 400. The optical attenuator 400 is comprised of a core 405 formed on a substrate 410. The three sides of the core 405 not in contact with the substrate 410 are covered with a cladding material 415 and a section of polymer cladding 420. The section of polymer cladding 420 has an identified length L along the axis of the core 405. Disposed adjacent to the polymer cladding 415 is a thermal device 425. Note that the thermal device 425 may actually be a thermoelectric heater 205 (FIG. 5) or a thermoelectric cooler 210 (FIG. 5) as previously discussed. Also, a laser source 305 (FIG. 6) may be employed in place of the thermal device 210. A cutaway line 427 is shown around the optical attenuator 400.

The operation of the optical attenuator 400 is as follows. An optical signal or light wave is transmitted through the core 405. When in an unattenuated state, the light wave is guided through core 405 with no significant loss or attenuation other than the inevitable loss imparted by the presence of the polymer cladding 420. In this case, the temperature of the polymer cladding 420 is increased so that its index of refraction is lowered to be approximately equal to the index of refraction $n_C$ of the cladding material 415. The actual temperature of the polymer cladding 420 that results in an index of refraction $n_P$ which is equal to the index of refraction $n_C$ of the cladding material 415 depends upon the type of polymer material 415 chosen as seen in FIG. 3. When attenuation of the light wave transmitted through the optical attenuator 400 is desired, the optical attenuator 400 is put into an attenuation state in which the polymer cladding 420 is cooled, for example, thereby raising the index of refraction $n_P$ to be approximately equal to or greater than the index of refraction $n_R$ of the core 405. When this occurs, the light is no longer contained in the core 405 and begins to leak out into the polymer cladding 420. The attenuation of the light wave varies depending on the difference between the index of refraction $n_P$ of the polymer cladding 420 and the index of refraction of the core 405. The attenuation of the light wave also varies with the identified length of the polymer cladding 420. The longer the polymer cladding length L, the greater the attenuation and vice versa. The actual length L of the polymer chosen depends upon the particular application as determined by one skilled in the art. The polymer cladding 420 may be cooled or allowed to cool to a point where the index of refraction $n_P$ of the polymer cladding is high enough that the light wave leaves the core 405 through the cladding 420 entirely, stopping the transmission of the light wave out of the optical attenuator 400. In this manner, the optical attenuator 400 may perform the function of an optical switch.

Figure 8:
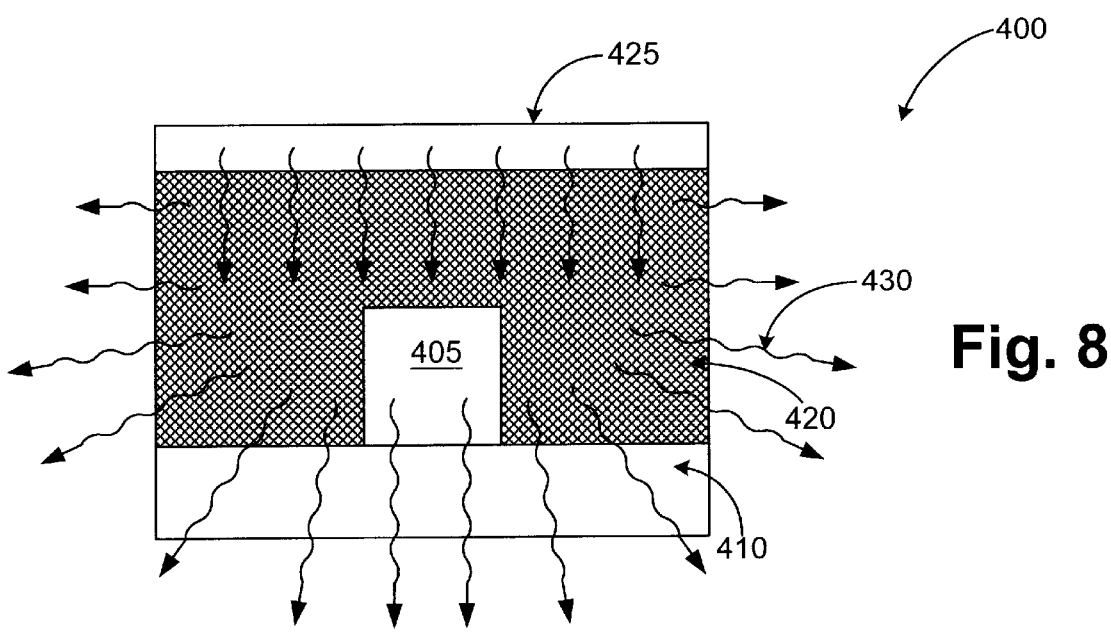
FIG. 8 is a drawing showing the dissipation of heat from the optical attenuator of FIG. 7.

Turning next to FIG. 8, shown is a sectional view of the optical attenuator 400 taken from the cutaway line 427 (FIG. 7) in which the thermal device 425 is generating heat 430 that leaves the thermal device 425 and enters the polymer cladding 420. The heat 430 then is dissipated from the polymer cladding 420 into the surrounding environment, including through the core 405 and the substrate 410. If the thermal device 425 were a thermoelectric cooler 210 (FIG. 5) the heat 430 would generally flow toward the thermal device 425 rather than away from it. Thus, a given optical attenuator 400 has a particular rate of heat loss given the nature of the optical attenuator structure and the temperature of the surrounding environment. Consequently, the optical attenuator 400 may be designed with these concepts in mind. That is to say, where a higher index of refraction $n_P$ of the polymer cladding 420 is desired, it may be necessary to employ a thermoelectric cooler 210 or similar device where the natural heat dissipation of the optical attenuator structure is inadequate or where the temperature of the surrounding environment of the optical attenuator 400 is too high to allow proper heat dissipation. If a lower index of refraction $n_P$ of the polymer cladding 420 is desired requiring higher polymer cladding temperatures, it may be necessary to employ a thermo-electric heater 205 (FIG. 5) where the natural heat absorption of the optical attenuator structure is inadequate or where the temperature of the surrounding environment of the optical attenuator 400 is too low resulting in greater heat dissipation. In some cases, both a thermoelectric heater 205 and a thermoelectric cooler 210 can be used concurrently.

Figure 9:
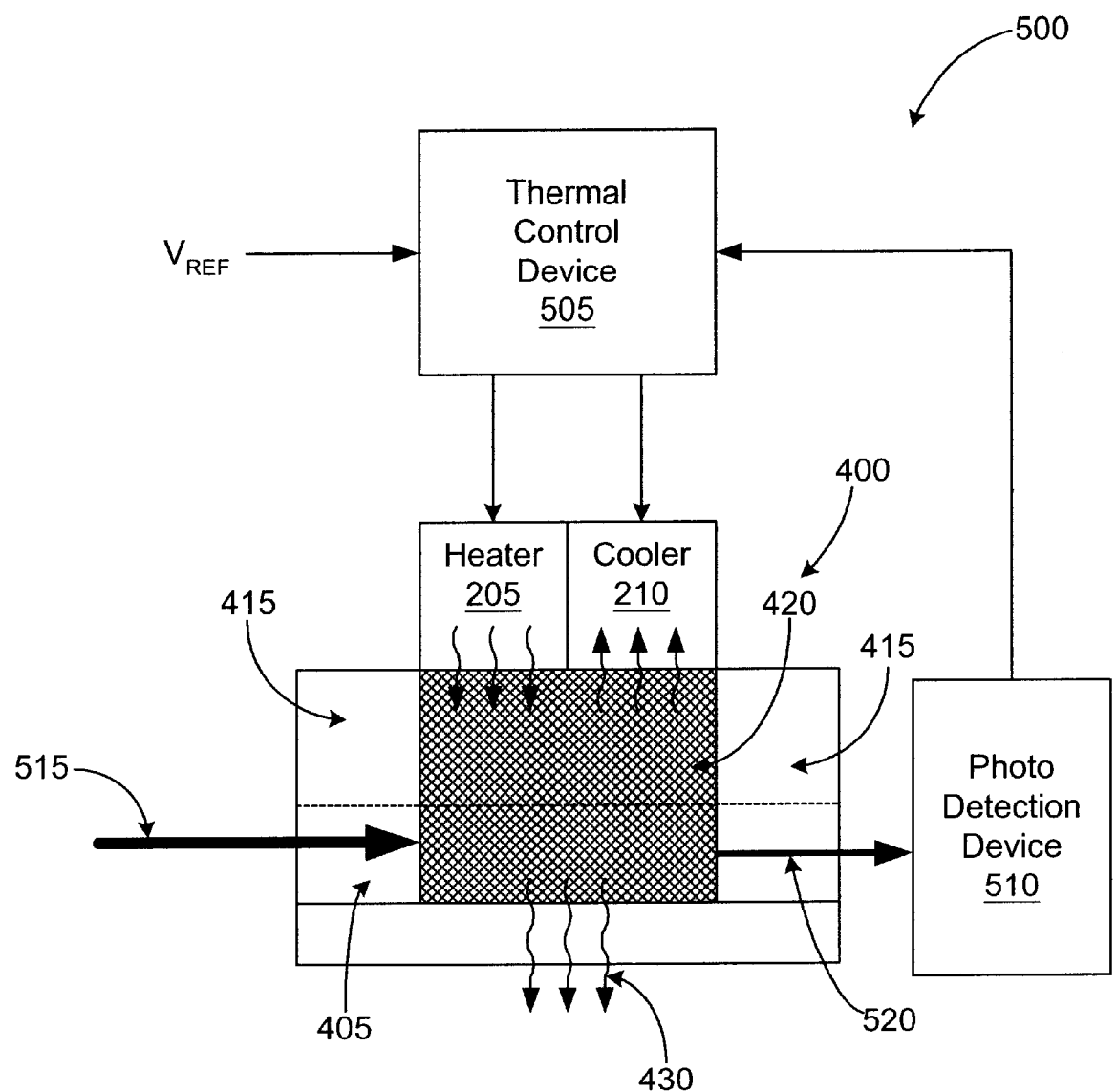
FIG. 9 is a drawing showing an optical attenuator system employing the optical attenuator of FIG. 7.

Referring next, to FIG. 9, shown is an optical attenuator system 500 which employs the optical attenuator 400 in a temperature control arrangement which employs a feedback loop. The optical attenuator system 500 comprises the optical attenuator 400 with a thermo-electric heater 205 and a thermoelectric cooler 210 positioned adjacent to the polymer cladding 420.

A thermal control device 505 is electrically coupled to both the thermoelectric heater 205 and the thermoelectric cooler 210 and transmits a power signal to these devices, thereby adding or subtracting heat to or from the polymer cladding 420 as needed. The power source receives a reference signal $V_{REF}$ which is proportional to the desired temperature of the polymer cladding 420, which, as discussed previously, is a function of the desired attenuation. A photo detection device 510 or similar device is optically coupled to the output of the optical attenuator 400 and is electrically coupled to the thermal control device 505. The photo detection device 510 generates a feedback signal which is transmitted to the thermal control device 505. This feedback signal allows the thermal control device 505 to maintain a steady temperature of the polymer cladding 420. In this manner, the incoming optical signal 515 is attenuated by leaking into the polymer cladding 420, resulting in an outgoing optical signal 520 with diminished power.

Figure 10:
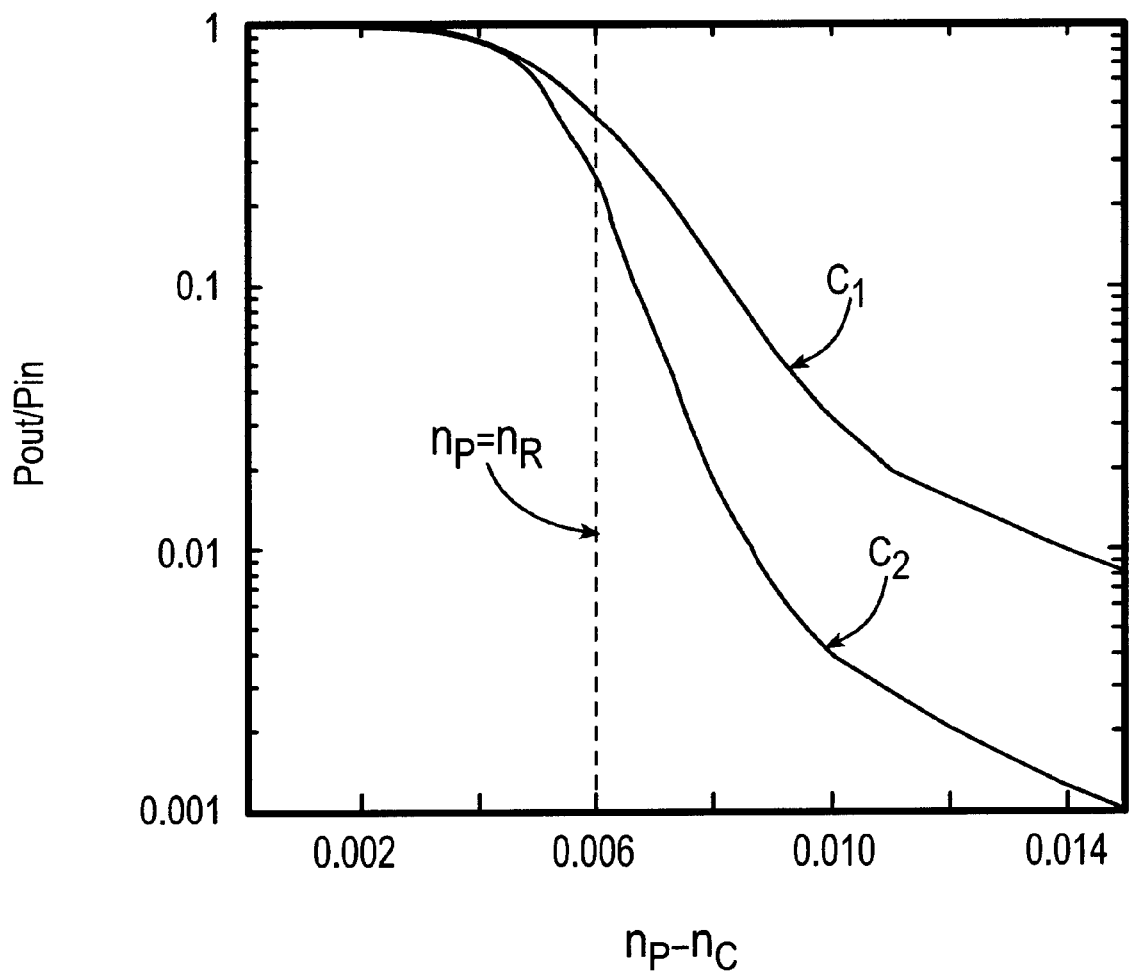
FIG. 10 is a graph of showing an example of the attenuation of a light wave in an optical attenuator of FIG. 7 as a function of the index of refraction of the polymer cladding.

Turning to FIG. 10, shown by way of an example is a graph which depicts the attenuation of a light wave in an optical attenuator 400 (FIG. 7) as a function of the index of refraction of the polymer cladding 420 (FIG. 7). The optical attenuator 400 data was analyzed with the following parameters:

wavelength, $\lambda=1.55$ $\mu$m
core index or refraction $n_R=1.45$
cladding material index of refraction $n_C=1.444$
core width d=5 $\mu$m $$V = \frac{2\pi d}{\lambda} \sqrt{n_R^2 - n_C^2}.$$

A Gaussian shaped beam was assumed transmitted into the core 405 of the attenuator 400 whose full width at the 1/e points of the power distribution is w=6.75 $\mu$m. At the output of the optical attenuator 400, the light wave power was collected over an area whose width is 14.3 $\mu$m. The widths of the incident light beam and of the collection area were chosen to ensure that the light beam traveled through the core 405 without width oscillations and that 99% of the power is captured when the index of refraction $n_P$ (FIG. 7) of the polymer cladding 420 equals the index of refraction nc (FIG. 7) of the cladding material 415. FIG. 10 shows a first curve $C_1$ and a second curve $C_2$ which represent the ratio of collected light ($P_{OUT}$) to input light power ($P_{IN}$) as functions of the difference between the index of refraction $n_C$ of the cladding material 415 and the index of refraction $n_P$ of the polymer cladding 420. For the first curve $C_1$, the length of the polymer section L is equal to 0.5 mm and for the second curve $C_2$, the length of the polymer section L is equal to 1 mm.

Many variations and modifications may be made to the embodiments of the invention without departing substantially from the spirit and principles of the invention. All such modifications and variations are intended to be included herein within the scope of the present invention, as defined by the following claims.

Having thus described the invention, it is claimed:

1. An optical attenuator, comprising:

a core having a core index of refraction;

a polymer cladding of an identifiable length, the polymer cladding surrounding the core and having a variable index of refraction, said variable index of refraction varying with temperature of the polymer cladding, wherein an attenuation of an optical signal transmitted through the core varies with the temperature of the polymer cladding; and a controller for controlling the temperature of the polymer cladding to achieve an identifiable attenuation of the optical signal transmitted through the core.

2. The optical attenuator of claim 1, wherein the temperature control means further comprises means for heating the polymer cladding.

3. The optical attenuator of claim 1, wherein the temperature control means further comprises means for cooling the polymer cladding.

4. An optical attenuator, comprising:

a core having a core index of refraction;

a polymer cladding of an identifiable length, the polymer cladding surrounding the core and having a variable index of refraction, said variable index of refraction varying with temperature of the polymer cladding;

a heater positioned adjacent the polymer cladding;

an optical output coupled to the cladding; and a photo detection device optically coupled to the optical output, the photo detection device configured for electrical coupling to a power source, and the photo detection device transmitting an optical feedback signal to the power source.

5. The optical attenuator of claim 4, comprising a power source electrically coupled to the heater, the power source transmitting a power signal to the heater, the power signal being based on a signal input and the optical feedback signal.

6. An optical attenuator, comprising:

a core having a core index of refraction;

a polymer cladding of an identifiable length, the polymer cladding surrounding the core and having a variable index of refraction, said variable index of refraction varying with temperature of the polymer cladding;

a thermo-electric cooler positioned adjacent the polymer cladding;

an optical output coupled to the cladding; and a photo detection device optically coupled to the optical output of the attenuator, the photo detection device configured for electrical coupling to a power source, and the photo detection device transmitting an optical feedback signal to the power source.

7. The optical attenuator of claim 6, comprising a power source electrically coupled to the cooler, the power source transmitting a power signal to the cooler, the power signal being based on a signal input and the optical feedback signal.

8. A method for attenuating an optical signal in a waveguide, comprising the steps of:

transmitting an optical signal having an initial power strength through an optical attenuator having a section of polymer cladding of an identifiable length contacting a core of the attenuator, wherein the polymer cladding has a variable index of refraction, wherein an attenuation of the optical signal varies with a temperature of the polymer cladding, and having an output coupled to the polymer cladding; and controlling temperature of the polymer cladding to attenuate the optical signal to a desired optical signal strength.

9. The method of claim 8, wherein the step of controlling the temperature of the polymer cladding further comprises the steps of:

generating an input signal indicating a desired optical signal strength at the output of the attenuator;

generating an optical feedback signal indicating the optical signal strength;

generating a heater signal in a controller based upon the input signal and the optical feedback signal; and applying the heater signal to a heater placed adjacent the polymer cladding to control the temperature of the polymer cladding.

10. The optical attenuator of claim 1, wherein the controller for controlling the temperature of the polymer cladding comprises:

a heater positioned adjacent the polymer cladding;

an optical output coupled to the cladding; and a photo detection device optically coupled to the optical output, the photo detection device configured for electrical coupling to a power source, and the photo detection device transmitting an optical feedback signal to the power source.

11. The optical attenuator of claim 10, further comprising:

a power source electrically coupled to the heater, the power source transmitting a power signal to the heater, the power signal being based on a signal input and the optical feedback signal.

12. The optical attenuator of claim 1, wherein the controller for controlling the temperature of the polymer cladding comprises:

a cooler positioned adjacent the polymer cladding;

an optical output coupled to the cladding; and a photo detection device optically coupled to the optical output, the photo detection device configured for electrical coupling to a power source, and the photo detection device transmitting an optical feedback signal to the power source.

13. The optical attenuator of claim 12, further comprising:

a power source electrically coupled to the cooler, the power source transmitting a power signal to the cooler, the power signal being based on a signal input and the optical feedback signal.

14. The optical attenuator of claim 2, wherein the means for heating the polymer cladding comprises:

a heater;

a power source electrically coupled to the heater;

a power signal transmitted by the power source to the heater, the signal being based on a signal input and an optical feedback signal.

15. The optical attenuator of claim 3, wherein the means for cooling the polymer cladding comprises:

a cooler;

a power source electrically coupled to the cooler;

a power signal transmitted by the power source to the cooler, the power signal being based on a signal input and an optical feedback signal.

* * * * *